United States Patent [19]

Schyboll et al.

[11] Patent Number: 4,896,867
[45] Date of Patent: Jan. 30, 1990

[54] HYDRAULICALLY DAMPING ELASTIC BEARING

[75] Inventors: Georg Schyboll, Sinzig-Westum; Heinz Brenner, Neuenahr, both of Fed. Rep. of Germany

[73] Assignee: Boge AG, Eitorf, Fed. Rep. of Germany

[21] Appl. No.: 153,231

[22] Filed: Feb. 8, 1988

[30] Foreign Application Priority Data

Feb. 7, 1987 [DE] Fed. Rep. of Germany ....... 3703820

[51] Int. Cl.$^4$ ............................................ F16F 13/00
[52] U.S. Cl. .................................... 267/140.1; 138/30; 138/43; 180/300; 180/312; 180/902; 248/562; 248/636
[58] Field of Search ..................... 267/140.1, 219, 127; 248/562, 634, 636; 180/300, 312, 902; 188/319; 138/30, 43

[56] References Cited

U.S. PATENT DOCUMENTS

| | | | |
|---|---|---|---|
| 4,011,893 | 3/1977 | Bentley | 138/46 X |
| 4,262,886 | 4/1981 | LeSalver et al. | 267/140.1 X |
| 4,422,779 | 12/1983 | Hamaekers et al. | 267/140.1 X |
| 4,573,656 | 4/1986 | Yoshida et al. | 267/140.1 X |
| 4,618,128 | 10/1986 | Hartel et al. | 267/140.1 |
| 4,645,189 | 2/1987 | Quast | 267/140 |
| 4,660,813 | 4/1987 | Reuter | 267/140.1 |
| 4,697,793 | 10/1987 | Reuter et al. | 267/195 |
| 4,697,794 | 12/1988 | Brenner et al. | 267/140.1 X |
| 4,721,288 | 1/1988 | Andra et al. | 248/562 X |

FOREIGN PATENT DOCUMENTS

| | | | |
|---|---|---|---|
| 3019337 | 11/1981 | Fed. Rep. of Germany | . |
| 3246587 | 6/1984 | Fed. Rep. of Germany | . |
| 3632612 | 4/1987 | Fed. Rep. of Germany | ... 267/140.1 |
| 155029 | 8/1985 | Japan | 267/140.1 |
| 164031 | 8/1985 | Japan | 267/140.1 |
| 172744 | 9/1985 | Japan | 267/140.1 |
| 205503 | 9/1986 | Japan | 267/140.1 |
| 274130 | 12/1986 | Japan | 248/562 |

Primary Examiner—George E. Halvosa
Attorney, Agent, or Firm—Nils H. Ljungman

[57] ABSTRACT

Hydraulically damping elastic bearing, in particular engine mounts for motor vehicles, with two rigid end walls opposite one another in the axial direction and at least two chambers containing damping fluid arranged axially one behind the other, whereby the chambers are connected for fluid communications with one another by a passage running in an annular fashion. For the variable modification of the length of the passage, partitions are inserted in the component containing the passage, which partitions divide the passage into individual passage segments connected for fluid communication with one another by an opening.

19 Claims, 8 Drawing Sheets

HYDRAULICALLY DAMPING ELASTIC BEARING

CROSS-REFERENCE TO CO-PENDING APPLICATION

Co-pending application Ser. No. 074,932, filed on July 17, 1987, now U.S. Pat. No. 4,781,362, entitled "Hydraulically Damping Elastic Bearing", which corresponds to Federal Republic of Germany Patent Appln. No. P 36 32 670.4, filed on Sept. 26, 1986, is assigned to at least one of the same assignees as the instant application.

BACKGROUND OF THE INVENTION

1. Field of the Invention

This invention relates to a hydraulically damping elastic bearings, in particular engine mounts for motor vehicles, with two rigid end walls opposite one another in the axial direction and at least two chambers containing damping fluid located axially one behind the other, whereby the chambers are connected with one another by means of a passage running in an annular fashion in an essentially radial plane and contained in a rigid component, and the intake and discharge ports each open into a chamber.

2. Description of the Prior Art

Such elastic bearings are used to mount drive units in motor vehicles of all types. In mounting internal combustion motors in motor vehicles, it is necessary on the one hand to have the softest possible suspension in order to prevent the transmission of noise, with a low self-damping which nevertheless allow the motor movements excited by the roadway to become very large and to decay almost undamped. On the other hand, large motor movements can be reduced by stiff suspensions or separate "Stuker" dampers, but that again leads to significant noise transmission to the body.

The prior art includes elastic bearings of this type (e.g. DE-OS No. 30 19 337), in which the desired damping action and the isolation action achieved can be optimized independently of one another, and where both a good damping characteristic is present, as well as a good isolation action. In theory, there is a passage which runs at a distance around the bearing axis. The principle of this passage is based on the fact that the damping action does not depend on throttling in the conventional sense with a conversion of the impact energy which occurs into thermal energy, but on the inertia of the quantity of fluid displaced in the annular passage. The annular passage is thereby housed in a rigid component, and the length of the passage is determined by the geometric conditions. A disadvantage is that the length of the passage can only be changed by changing the construction of the rigid component.

The prior art also includes engine mounts (e.g. DE-PS No. 32 46 587), which corresponds to U.S. Pat. No. 4,697,794, in which the annular throttle passage is housed in a rigid component, which is suspended elastically as a whole, and thus divides the chambers. The passage in this engine mount also has a fixed and specified length.

The above-mentioned patents are incorporated herein by reference as if the entire contents thereof were fully set forth herein.

U.S. Pat. Nos. 4,645,189, 4,660,813 and 4,697,793 are also incorporated herein by reference as if the entire contents thereof were fully set forth herein.

OBJECT OF THE INVENTION

The object of the invention is to design a component for an engine mount to house the annular passage, so that the length of the passage can be varied with the use of simple components.

SUMMARY OF THE INVENTION

To achieve this object, according to the invention, in the rigid component, there is at least one partition which separates the passage into individual passage segments, whereby there is a connection between the individual passage segments by means of at least one opening in the partition element in question.

One advantage is that, in a particularly simple matter, the length of the passage can be significantly increased while retaining a standard component. The length of the passage determines, among other things, the position of the damping maximum, so that as a result of the lengthening of the passage, acceptable damping maxima can be realized even in the lower frequency range. The passage can thereby be located in the rigid component and consists of one or more passage segments running around the bearing axis, or in a spiral fashion.

In one advantageous embodiment of the invention, the partition element consists of at least one disc or at least one ring.

Moreover, according to another essential characteristic of the invention, the partition element consists of at least one disc and at least one ring. With such a configuration of the partition element, at least four passage segments can be produced, which can be connected in series, one behind the other, by means of openings, thereby significantly increasing the length of the passage.

In one configuration of the invention, the rigid component is designed in two parts, and the partition element inserted in the separation plane.

To further increase the variability in the length of the passage, the partition element is mounted in a groove of the rigid component so that it can rotate. An advantage here is that as a result of the rotation of the disc or of the ring, the length of the passage in the area in question can be modified. Depending on the position of the opening in relation to the intake and discharge port of the passage, the result is an appropriate overall length of the passage.

Another essential characteristic is that there are at least two intake ports, which work together with a corresponding number of discharge ports, and that the partition elements exhibits an opening, which connects all the passage segments with one another. It is thereby advantageous that the passage segments in question can be lengthened, and as a result of the number of corresponding intake and discharge ports, the desired cross-section can be achieved. The determination of the cross-section is thereby a determining factor for the volume flow.

One aspect of the invention resides broadly in a resilient mounting device having hydraulic damping for vibrationally damping a motor vehicle engine, the mounting device having a longitudinal axis along which damping is prevalent, the mounting device having opposite first and second rigid end portions with mounting apparatus thereat, the end portions being at either end of the longitudinal axis. A resilient connecting element resiliently connects the first and second end portions and forms with them a cavity for two chambers in controllable fluid communication, each with the other, the two chambers for containing damping fluid, and being disposed one adjacent the other along the longitudinal axis. A first of the two chambers is a compression chamber for permitting a build-up of pressures substantially above and below ambient pressure about the mounting device. The two chambers are separated by partition apparatus, the partition apparatus having a rigid portion. The rigid portion has a central axis, which is generally perpendicular to the longitudinal axis defined therethrough, and also has a channel connecting the first and the second chamber. The channel follows an arcuate route which has a predetermined length which is at least partially radially displaced from and about the central axis in the rigid inner portion. The channel is divided by dividing apparatus into at least a first segment portion and a second segment portion, along at least a portion of the length of the channel, the first segment portion and a second segment portion having an opening therebetween to permit flow of fluid therebetween, the dividing apparatus and the opening being disposed to permit flow of fluid substantially along a substantiated portion of each of the first segment portion and a second segment portion when flowing from one chamber to the other, to substantially increase a path of flow of fluid over the length of the channel when undivided and thus provide damping in a given type of pressure difference between the two chambers in a given frequency range.

Another aspect of the invention reside broadly in a resilient mounting device having hydraulic damping for vibrationally damping a motor vehicle engine, the mounting device having a longitudinal axis along which damping is prevalent, the mounting device having opposite first and second rigid end portions with mounting apparatus thereat, the end portions being at either end of the longitudinal axis. A resilient connecting element resiliently connects the first and second end portions and form with them a cavity for two chambers in controllable fluid communication, each with the other, the two chambers are for containing damping fluid, and are disposed one adjacent the other along the longitudinal axis. A first of the two chambers is a compression chamber defined in part by the first rigid end portion which is sealed for permitting a build-up of pressures substantially above and below ambient pressure about the mounting device. A second of the two chambers is an unpressurized equalization chamber, the adjacent second rigid end portion defining therein airflow evacuation openings for substantially equalizing pressure in the second of the two chambers with the ambient pressure about the mounting device. The two chambers are separated by circular partition apparatus, the partition apparatus having a circular outer flexible peripheral portion and a circular rigid inner portion, the rigid inner portion being disposed within the outer peripheral portion of the partition apparatus, the outer peripheral portion comprising a flexible suspension element for holding the rigid inner portion resiliently suspended between and movable within the two chambers and damping a first type of pressure differences at least in a first frequency range between the two chambers. The rigid inner portion has a central axis, which is generally perpendicular to the longitudinal axis defined therethrough, and has a channel connecting the first and the second chamber, the channel following an arcuate route having a predetermined length, which is at least partially radially displaced from and about the central axis in the rigid inner portion. The channel is divided by a dividing apparatus into at least a first segment portion and a second segment portion, along the length of the channel, the first segment portion and a second segment portion having an opening therebetween to permit flow of fluid therebetween, the dividing apparatus and the opening being disposed to permit flow of fluid substantially along a substantiated length of each of the first segment portion and a second segment portion when flowing from one chamber to the other, to substantially increase a path of flow of the fluid over the length of the channel when undivided and thus provide damping in a second type of pressure difference between the two chambers in a second frequency range distinct from the first frequency range.

Yet another aspect of the invention resides broadly in a resilient engine mounting device having hydraulic damping for vibrationally damping a motor vehicle engine, the mounting device having at least a longitudinal axis along which damping is prevalent, the mounting device having a body with opposite end portions having mounting means thereat, the end portions being aligned with the longitudinal axis and at either end of the device. The device is of the type including an elastomeric structure which is attached to the opposite end portions, which include a first chamber and a second chamber and two chambers for containing damping fluid, the first chamber being defined, at least in part, by the elastomeric structure and a first of the end portions, the two chambers being disposed one adjacent another along the longitudinal axis. The two chambers are separated by partition apparatus, the partition apparatus having a resilient outer, circumferential, peripheral portion and a movable, rigid inner portion, the inner portion being disposed and suspended within the outer, peripheral portion of the partition apparatus, the outer, peripheral portion having a flexible portion. The outer, peripheral portion is disposed to separate the body into the two chambers. The second chamber has an arrangement for relieving pressure therein. The first chamber has an arrangement, including the elastomeric structure and the first end portion and the partition apparatus, for creating a pressure therein substantially different from ambient pressure by movement of the first end portion and the second end portion with respect to one another during operation. At least one throttle arrangement is disposed in the rigid inner portion for providing fluid communication between the chambers. The throttle apparatus comprises at least a first and a second arcuate passage in the rigid inner portion, the first and the second arcuate passages having an opening therebetween for permitting flow of the damping therebetween, the opening between the arcuate passages being disposed for abruptly changing direction of flow in one of the passages to direction of flow in another of the passages.

A yet further aspect of the invention resides broadly in a resilient mounting device having hydraulic damping for vibrationally damping a motor vehicle engine, the mounting device having a longitudinal axis along which damping is prevalent, the mounting device having opposite first and second rigid end portions with mounting means thereat, the end portions being at either end of the longitudinal axis. A resilient connecting element resiliently connects the first and second end portions and form with them a cavity for two chambers in controllable fluid communication, each with the other, the two chambers are for containing damping fluid, and are disposed one adjacent the other along the longitudinal axis. A first of the two chambers is a compression chamber defined in part by the first rigid end portion which is sealed for permitting a build-up of pressures substantially above and below ambient pressure about the mounting device. A second of the two chambers is an unpressurized equalization chamber, the adjacent second rigid end portion defining therein airflow evacuation openings for substantially equalizing pressure in the second of the two chambers with the ambient pressure about the mounting device. The two chambers are separated by a circular partition apparatus, the partition apparatus having a circular outer flexible peripheral portion and a circular rigid inner portion, the rigid inner portion being disposed within the outer peripheral portion of the partition apparatus, the outer peripheral portion comprising a flexible suspension element for holding the rigid inner portion resiliently suspended between and movable within the two chambers and damping a first type of pressure differences at least in a first frequency range between the two chambers. The rigid inner portion has a central axis, which is generally perpendicular to the longitudinal axis defined therethrough, and has a channel connecting the first and the second chamber, the channel following an arcuate route having a predetermined length, being at least partially radially displaced from and about the central axis in the rigid inner portion. An arrangement for adjusting the length of the channel to the predetermined length during assembly of the rigid inner portion, and for tuning the damping of the passage to a given frequency range and thus providing damping in a second type of pressure difference between the two chambers in a second frequency range distinct from the first frequency range.

Still another aspect of the invention resides broadly in a rubber engine mounting for motor vehicles with hydraulic damping, the engine mounting having two rigid end walls which are disposed opposite to each other in the axial direction, and two fluid chambers which are arranged axially one adjacent to the other and which contain damping fluid, and of which at least one chamber has a peripheral wall which is formed as a rubber-elastic spring element such that the two end walls are resiliently connected, wherein the chambers communicate with each other by way of a flow passage which extends in an annular configuration around the central axis of the mounting in a substantially radial plane, the flow passage being provided in a movable, rigid partitioning wall separating the chambers, with inlet and outlet openings of the flow passage being disposed on respective sides of the rigid partitioning wall, the rigid partitioning wall which has the flow passage being arranged radially inwardly of, and supported by, an elastic, axially movable diaphragm which is fixedly and sealingly clamped at its outer periphery, the flow passage being substantially entirely enclosed within, and movable with, the movable rigid partitioning wall, the rigid partitioning wall in the elastic, axially movable diaphragm, in combination with the diaphragm, providing a damping characteristic which damps and decouples high frequency vibrations and noise generated in use by the running of the engine in a range of about 20 Hertz to about 200 Hertz. The flow passage has a length and a cross section area for damping and decoupling low frequency vibrations, produced by at least engine start-up and shut down, which are transmitted in use between one of the two rigid end walls and the other, the low frequency vibrations being lower than the high frequency vibrations in a range of about 20 Hertz to about 200 Hertz generated by the running of the engine, whereby transmission of the engine vibrations from the engine, both by vibrations from the running engine and vibrations produced by the road and the turning on and off of the engine, to the body of the motor vehicle is minimized. The flow passage is divided into at least two sections to increase the length thereof as described herein. The movement of the rigid partitioning wall is limited by a washer which extends at least partially into a groove disposed about the outer periphery of the rigid wall.

Preferred embodiments of the invention are illustrated in greater detail in the accompanying drawings.

DESCRIPTION OF THE PREFERRED EMBODIMENTS

Figure 1:
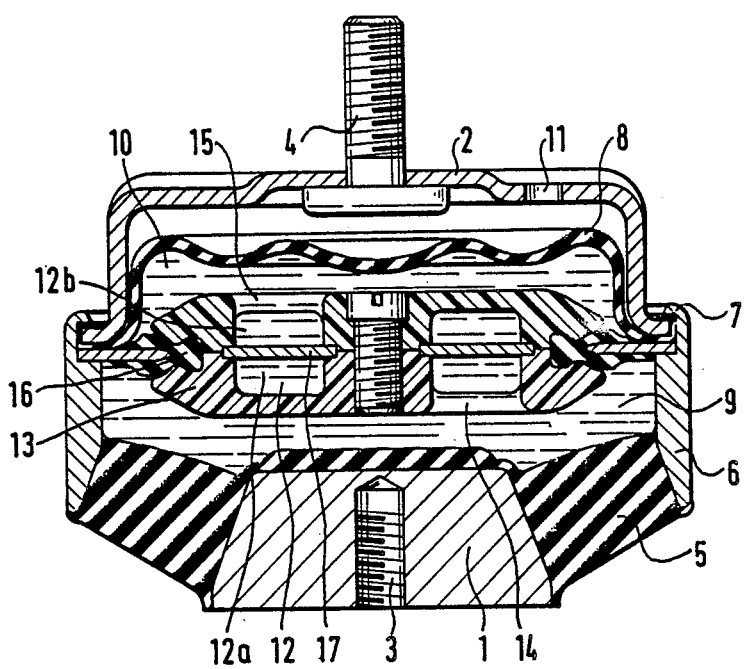
FIG. 1 shows an axial longitudinal section of an engine mount.

The engine mount illustrated in FIG. 1 has two end walls 1 and 2 opposite one another in the axial direction. The end wall 1 has a threaded hole 3 or a threaded rod (not shown) to fasten it. The end wall 2, designed as a cover plate, has a corresponding fastening rod 4.

Vulcanized onto the conical jacket surface of the end wall 1 is a circumferential wall designed as an elastic suspension element 5, which is united at its connecting surface facing away from the end wall 1 with a connection flange 6. The connecting flange 6 also has a raised edge 7, which holds a membrane 16, a bellows 8 and the end wall 2 designed as a cover plate.

The engine mount thereby has two chambers 9 and 10, separated from one another by the membrane 16 and the rigid component 13, and containing damping fluid, in which the chamber 9 is designed as the pressure chamber and the chamber 10 as the unpressurized, volume equalization chamber. For the sake of completeness it should be mentioned that there is an vent opening 11 in the end wall 2.

The rigid component contains a passage 12 which runs in an annular fashion in a radial plane around the center axis of the bearing, and connects the two chambers 9 and 10 with one another. The annular passage 12 exhibits a longitudinal and cross sectional surface such that the resonance frequency of the amount of fluid displaced during damping operation of the bearing in the annular passage 12, together with the elasticities of the elastic suspension element 5 and the flexible membrane 16, essentially corresponds to the resonance frequency of the vehicle motor on its suspension. The rigid component 13 is formed in two substantially identical halves. A first half of the rigid component 13 is rigidly connected to the second half by means of a bolt, after the channel 12 dividing means 17 has been positioned in a predetermined location. This permits varying the flow path of the hydraulic fluid so that identical parts can be used for a number of conditions affecting the damping function of the resilient engine mount. These conditions are well known in the art and include, for example, the size of engine, equipment on vehicle, and type of carbueration system.

The membrane 16, which is rigidly braced on its outside circumference, is connected with the rigid component 13. The annular passage 12 housed in the rigid component 13 has intake and discharge ports 14 and 15 respectively, which each open into an end surface of a rigid component 13.

Configurations are also possible, however, in which the rigid component is located outside, and there is an elastic membrane in its center.

The partition 17 is located in the annular passage 12 so that the passage 12 is divided into two individual passage segments 12a and 12b.

Figure 2:
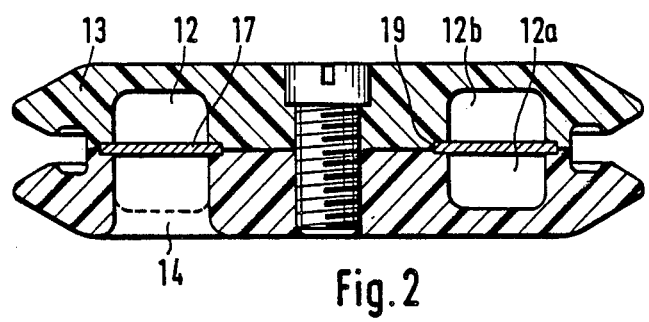
FIG. 2 shows a section through a rigid element, together with passage.

In FIG. 2, the rigid component 3 is illustrated by itself, whereby the annular passage 12 is divided into two individual passage segments 12a and 12b by the partition 17.

Figure 3:
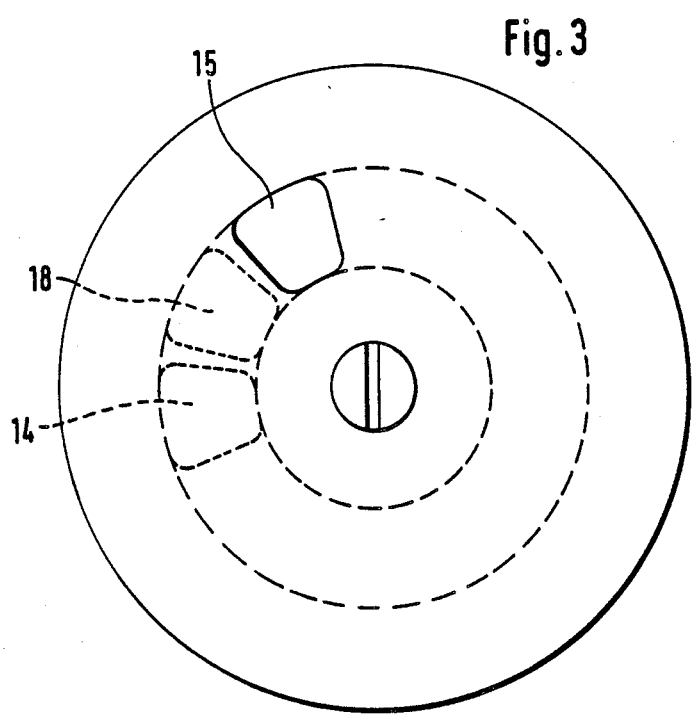
FIG. 3 shows an overhead view of the rigid element illustrated in FIG. 2.

In the overhead view shown in FIG. 3, it is apparent that the damping medium gets into the passage 12a via the intake port 14, and from there it travels via the opening 18 into the second passage segment 12b, and on top through the discharge port 15 into the other chamber. As a result of the insertion of the partition 17, the length of the passage 12 can be approximately doubled. When the opening 18 is moved to the circumference of the passage 12, however, different lengths of the passage 12 can be achieved, so that by rotating the partition 17, it is possible to precisely tune the properties of the engine mount.

Figure 4:
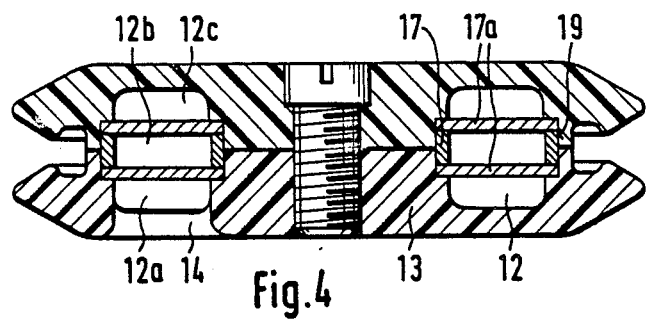
FIGS. 4-11 show different variants of rigid elements.
Figure 5:
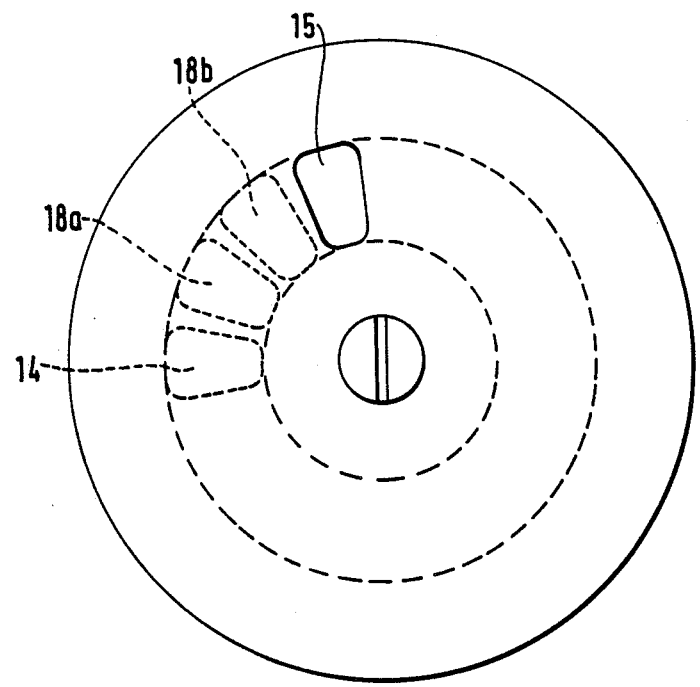

A further extension of the passage 12 can be achieved, as shown in FIGS. 4 and 5, by the insertion of two discs 17a into the rigid component 13. The passage 12 is thereby divided into the individual passage segments 12a, 12b and 12c. By means of corresponding openings 18a and 18b, the damping medium can flow from the intake or discharge ports, respectively 14 and 15, into the passage. In this embodiment too, the partition 17 is housed in a groove 19 of the rigid component 13, and depending on the embodiment, is movably mounted in this groove 19. The groove 19 is thereby located in the separation plane of the rigid component 13, which consists of two parts.

Figure 6:
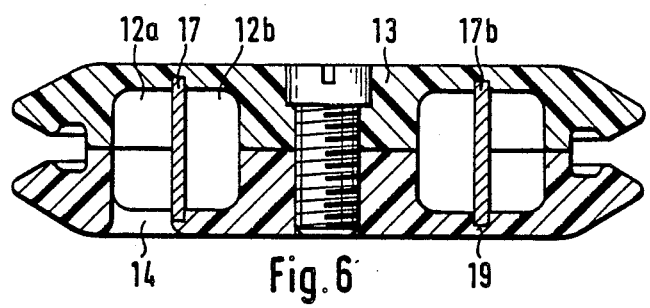
Figure 7:
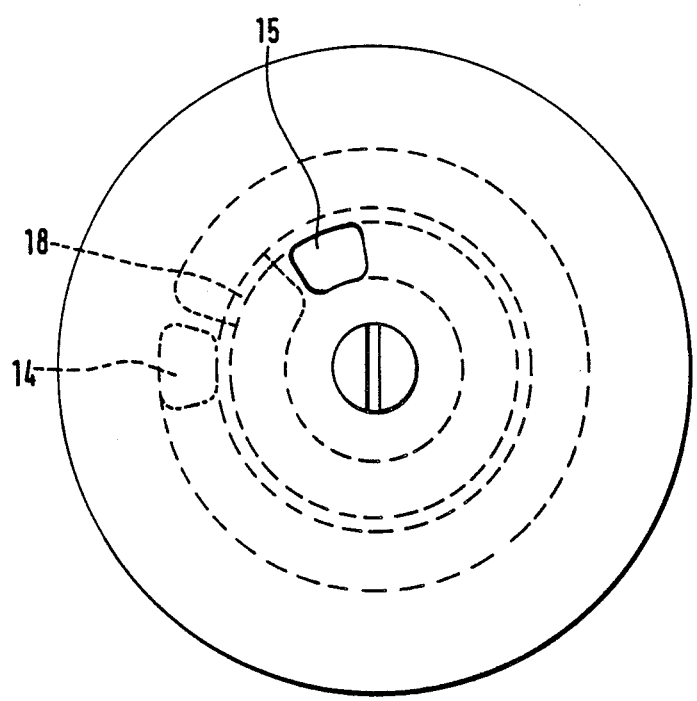

FIGS. 6 and 7 show a rigid component 13, which corresponds in principle to the one illustrated in FIG. 2 and 3, but the partition 17 is a ring 17b, which exhibits an opening 18 and thus again divides the passage 12 into the passage segments 12a and 12b. This ring 17b can also be located in a groove 19, and thus can move around the circumference, so that a corresponding adjustment of the length of the passage 12 become possible. FIG. 7 shows, in an overhead view, the intake and discharge ports 14 and 15 respectively, as well as the opening 18 in the ring 17b.

Figure 8:
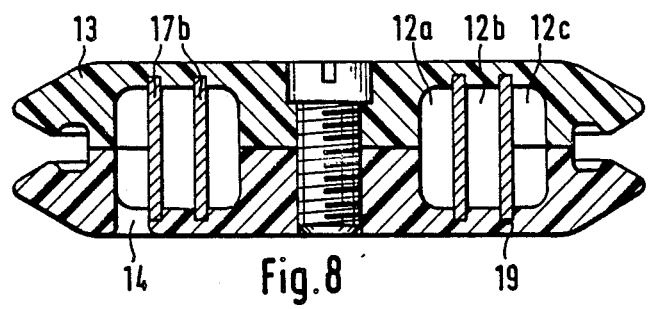
Figure 9:
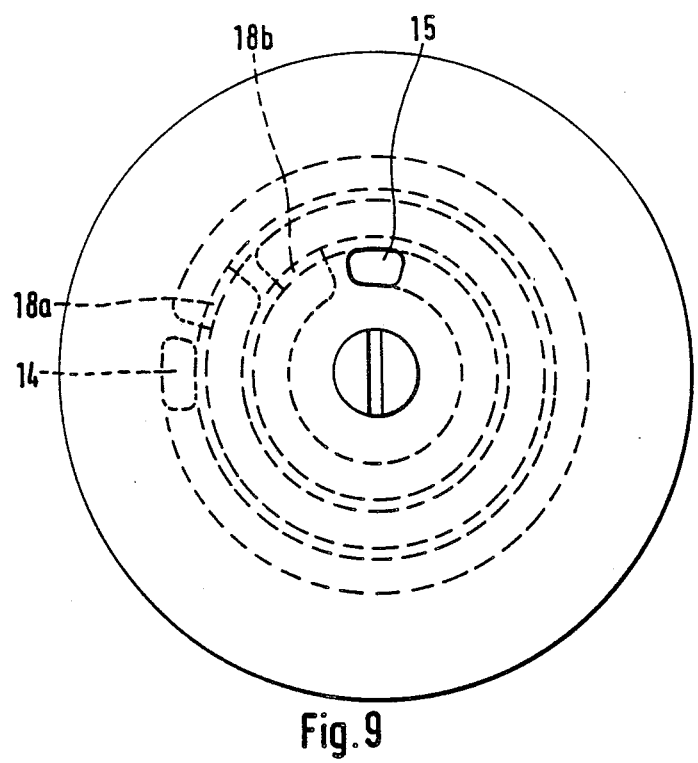

In FIGS. 8 and 9, there are two rings 17b with different diameters housed in the rigid component 13, so that a further modification of the length of the passage 12 is possible. As shown in FIG. 9, the passage 12 is divided into the individual passage segments 12a, 12b and 12c, whereby the connection is made via the openings 18a and 18b. The rings 17b can thereby be designed simply as a one-piece component in a groove 19. On account of the adjustment capability of the individual rings 17b in the groove 19, a precision adjustment of the required length of the passage 12 can once again be achieved.

Figure 10:
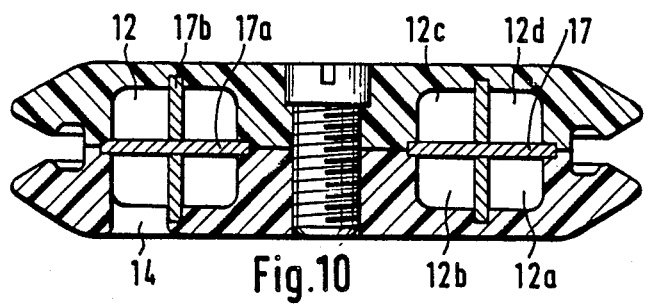
Figure 11:
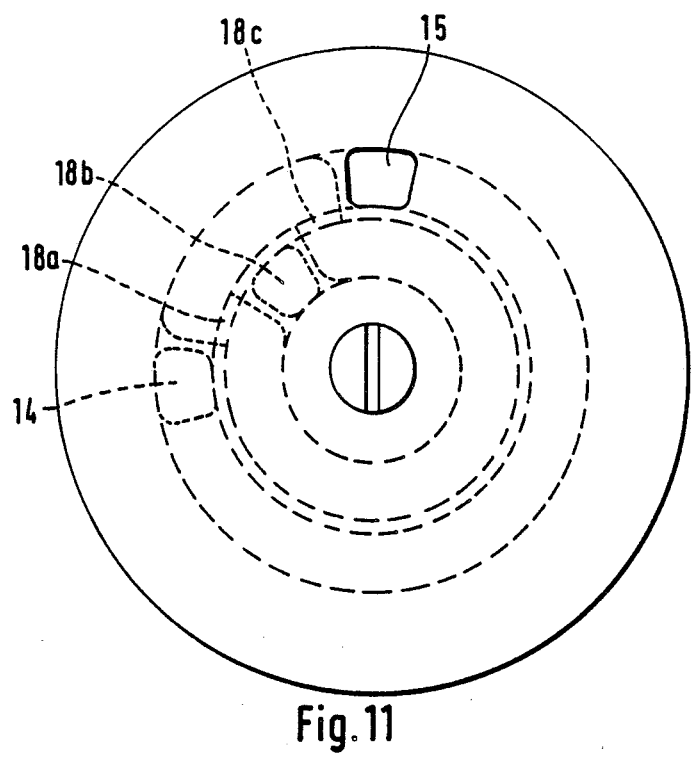

In the embodiments illustrated in FIGS. 10 and 11, a passage 12 is divided by a disc 17a and a ring 17b into four individual passage segments 12a to 12d. By means of an intake or discharge port 14, the damping medium travels into the first passage segment 12a, and by means of an opening 18a it travels into the second passage segment 12b. There is another opening 18a in the disc 17a, so that the damping medium can travel from the second passage segment 12b into the third passage segment 12c, and from there via an opening 18c into the fourth passage segment 12d, and thus to the intake or discharge port 15. With such an embodiment, too, the length of the passage 12 can be individually set, whereby only geometrically simple components are used.

Figure 12:
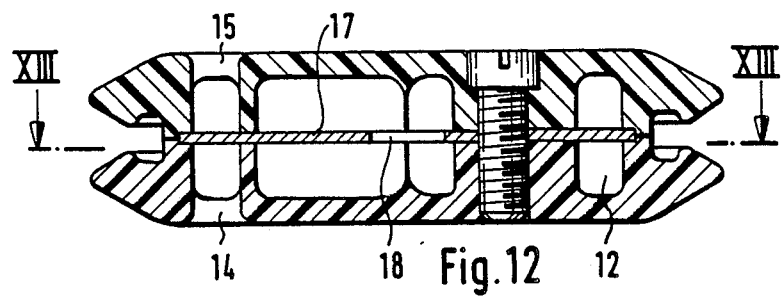
FIGS. 12 and 13 show another variant of a rigid component.
Figure 13:
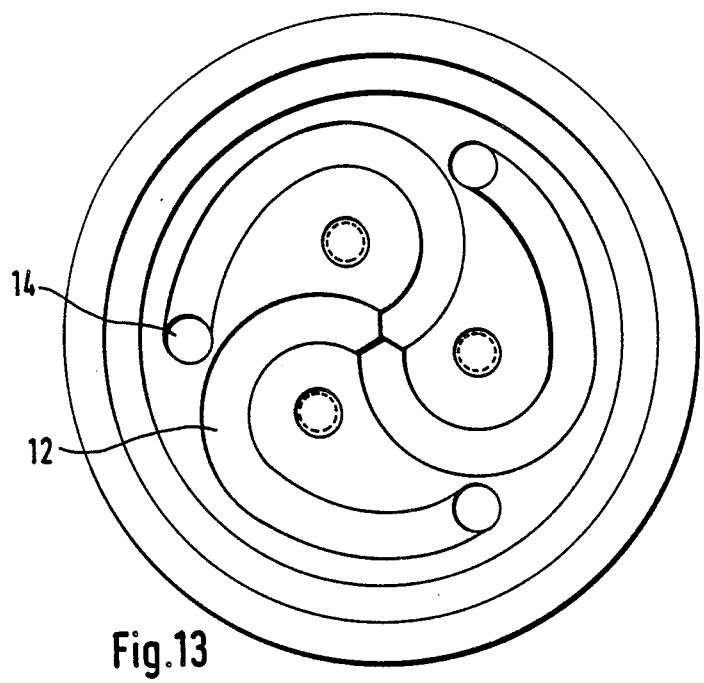

FIGS. 12 and 13 show an embodiment in which there are three passages 12 running spirally in the rigid component 13. Each passage has an intake opening 14. The partition 17 has a central opening 18, so that all the passage segments run to the central opening 18 and are then divided into a corresponding number of passage segments. From there, the passage segments run to the discharge ports 15. Each individual passage is lengthened by the partition and at the same time, the number of individual passages influences the cross section.

Figure 14:
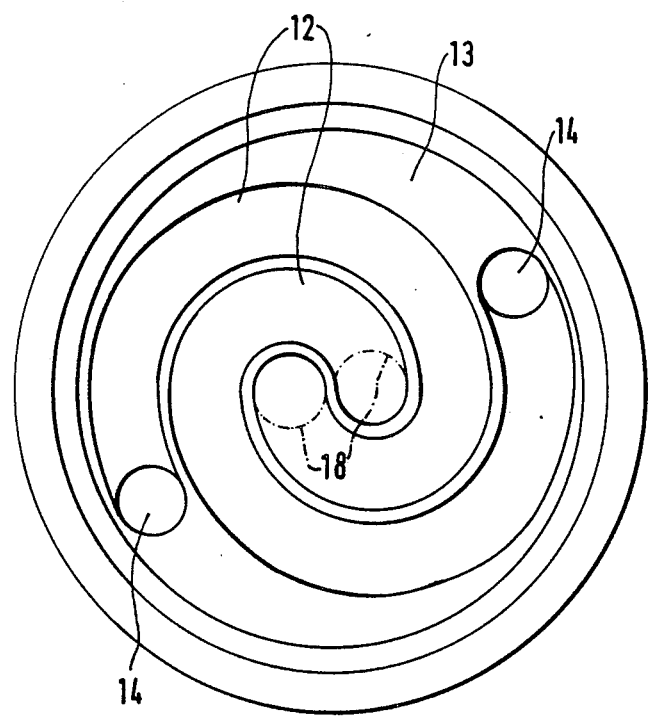
FIG. 14 shows another rigid component.

FIG. 14 illustrates another embodiment, in which the rigid component 13 exhibits two annular passages. Each passage 12 has an intake or discharge port 14, whereby the passage 12 in question runs toward an opening 18 in the partition 17. It is thereby possible to double the length of the passage.

An advantageous embodiment provides that the dimensions of the annular flow passage are selected in accordance with the following relationship: $F/L = f$ wherein L denotes the length of the flow passage and F denotes the cross-sectional area thereof and f is the frequency, which is typically the damping frequency of the annular or other flow passage.

By dividing the passage into segments the length is increased at least two fold and the cross-sectional area at least halved. Thus the damping frequency is extended down in magnitude by a factor of about two times 1.414 which equals 2.828. Therefore, a low frequency of damping such as 12 to 15 Hertz can be obtained even in a small engine mounting. Alternately, a very low damping frequency can be produced, or further a particular structure can be tuned to a variety of various vehicles by rotating the location of the opening or openings between the passage segments during assembly, thereby allowing one structure with identical components to be the basis for a great many finished motor mounts with greatly differing and tailor made damping characteristics.

The invention as described hereinabove in the context of the preferred embodiments is not to be taken as limited to all of the provided details thereof, since modifications and variations thereof may be made without departing from the spirit and scope of the invention.

What is claimed is:

1. A resilient mounting device having hydraulic damping for vibrationally damping a motor vehicle engine, said mounting device having a longitudinal axis along which damping is prevalent, said mounting device comprising:
opposite first and second rigid end portions with mounting means thereat, said end portions being disposed along said longitudinal axis at either end of said mounting device;
a resilient connecting element resiliently connecting said first and second end portions and forming with them a cavity for two chambers in controllable fluid communication, each with the other, said two chambers for containing damping fluid, and being disposed one adjacent the other along said longitudinal axis;

a first of said two chambers being a compression chamber for permitting a build-up of pressures substantially above and below ambient pressure about said mounting device;

said two chambers being separated by partition means, said partition means having a rigid inner portion and a flexible portion engaging said rigid inner portion, each of said rigid inner portion and said flexible portion being disposed in a plane substantially perpendicular to said longitudinal axis;

said rigid inner portion having a channel connecting said first and said second chambers, said channel following a circular route and having a predetermined length, said circular route being at least partially radially displaced from and about said longitudinal axis in said rigid inner portion, said rigid inner portion being formed in two pieces and including a means for securing a first of said two pieces to a second of said two pieces;

dividing means for dividing said channel into a divided channel having at least a first segment portion and a second segment portion, along at least a portion of the length of said channel, said dividing means having an opening to permit flow of fluid between said first segment portion and said second segment portion, said dividing means and said opening therein being disposed within an inner portion of said rigid portion of said partition means to permit flow of fluid substantially along a substantial portion of each of said first segment portion and said second segment portion when flowing from one chamber to the other, to substantially increase a path of flow of said fluid over the length of said channel when undivided, and providing means for adjusting an adjusted length of said divided channel during manufacture by angularly moving said dividing means disposed in said divided channel during manufacture to tune said divided channel such that said divided channel thus provides damping in a given type of pressure difference between said two chambers in a given frequency range;

said opening in said dividing means being substantially completely open at a continuity of angular locations during any angular movement during manufacture along said circular route of said channel and;

said divided channel having a substantially constant cross section throughout said adjusted length thereof such that a flow rate, of said flow of fluid through said adjusted length of said divided channel through which fluid flows, remains substantially the same.

2. The mounting device according to claim 1, wherein said dividing means comprises at least one disc shaped member disposed substantially in said plane substantially perpendicular to said longitudinal axis within said rigid portion.

3. The mounting device according to claim 2, wherein said dividing means additionally comprises at least one ring shaped member disposed within said rigid inner portion.

4. The mounting device according to claim 1, wherein said dividing means comprises at least one ring shaped member disposed within said rigid inner portion.

5. The mounting device according to claim 1, wherein said dividing means comprises at least one disc shaped member and at least one ring shaped member, each said at least one disc shaped member and each said at least one ring shaped member having at least one of said openings therein for permitting fluid to flow between said segment portions connected thereto.

6. The mounting device according to claim 5, wherein said dividing means is inserted between said at least two pieces.

7. The mounting device according to claim 5, wherein said rigid inner portion has at least two intake ports, a corresponding number of passage segment portions and a corresponding number of discharge ports, said at least two intake ports each being connected to a corresponding one of said passage segment portions and through its corresponding passage segment portions to a corresponding one of said discharge ports; at least two openings which connect at least two pairs of said segment portions with one another.

8. The mounting device according to claim 1, wherein said dividing means is inserted between said at least two pieces.

9. The mounting device according to claim 8, wherein said rigid inner portion has at least one groove therein for receiving said dividing means, said dividing means being rotatable, during assembly of said rigid inner portion, in said at least one groove in said rigid inner portion.

10. The mounting device according to claim 9, wherein said rigid inner portion has at least two intake ports, a corresponding number of passage segment portions and a corresponding number of discharge ports, said at least two intake ports each being connected to a corresponding one of said passage segment portions and through its corresponding passage segment portions to a corresponding one of said discharge ports; at least two openings which connect at least two pairs of said segment portions with one another.

11. The mounting device according to claim 1, wherein said rigid inner portion has at least one groove therein for receiving said dividing means, said dividing means being rotatable, during assembly of said rigid inner portion, in said at least one groove in said rigid inner portion.

12. The mounting device according to claim 1, wherein said rigid inner portion has at least two intake ports, a corresponding number of passage segment portions and a corresponding number of discharge ports, said at least two intake ports each being connected to a corresponding one of said passage segment portions and through its corresponding passage segment portions to a corresponding one of said discharge ports; at least two openings which connect at least two pairs of said segments portions with one another.

13. A resilient mounting device having hydraulic damping for vibrationally damping a motor vehicle engine, said mounting device having a longitudinal axis along which damping is prevalent, said mounting device comprising:

opposite first and second rigid end portions with mounting means thereat, said rigid end portions being disposed along said longitudinal axis at either end of said mounting device;

a resilient connecting element resiliently connecting said first and second end rigid portions and forming with them a cavity for two chambers in controllable fluid communication, each with the other, said two chambers for containing damping fluid, and being disposed one adjacent the other along said longitudinal axis;

a first of said two chambers being a pressure chamber defined in part by said first rigid end portion which is sealed for permitting a build-up of pressures substantially above and below ambient pressure about said mounting device;

a second of said two chambers being an unpressurized equalization chamber, said adjacent second rigid end portion defining therein airflow evacuation openings for substantially equalizing pressure in said second of said two chambers with said ambient pressure about said mounting device;

said two chambers being separated by a circular partition means, said partition means having a circular outer flexible peripheral portion and a circular rigid inner portion, said rigid inner portion being disposed within said outer peripheral portion of said partition means, said outer peripheral portion comprising a flexible suspension element for holding said rigid inner portion resiliently suspended between and movable within said two chambers and damping a first type of pressure differences at least in a first frequency range between said two chambers;

said rigid inner portion being disposed in a plane, which is generally perpendicular to said longitudinal axis defined therethrough;

said rigid inner portion having a channel connecting said first and said second chamber, said channel, following a circular route having a predetermined length, being at least partially radially displaced from and about said longitudinal axis in said rigid inner portion;

means for adjusting an adjusted length of said channel to said predetermined length during assembly of said rigid inner portion, and for tuning the damping of said passage to a given frequency range and thus providing damping in a second type of pressure difference between said two chambers in a second frequency range distinct from said first frequency range, said means for adjusting including dividing means for dividing said circular route of said channel into a divided channel having two portions including said adjusted length, said dividing means for dividing having an opening to permit flow of fluid between said two portions for passing said fluid between said two chambers, said dividing means being angularly movable during manufacture for positioning said opening therein over a substantial portion of said length of said circular channel;

said opening being substantially completely open during its angular movement relative to said channel;

said partition means comprising two pieces;

means for securing said two pieces of said partition means to one another; and said divided channel having a substantially constant cross section throughout said adjusted length thereof such that a flow rate, of said flow of fluid through said adjusted length of said divided channel through which fluid flows, remains substantially the same.

14. A mounting device according to claim 13, wherein said length adjusting means further includes said dividing means positioned between said two pieces of said rigid inner portion.

15. The mounting device according to claim 14, wherein said dividing means comprises at least one disc shaped member disposed within said rigid inner portion.

16. The mounting device according to claim 14, wherein said dividing means comprises at least one ring shaped member disposed within said rigid inner portion.

17. The mounting device according to claim 14, wherein said dividing means comprises at least one disc shaped member and at least one ring shaped member, each said at least one disc shaped member and each said at least one ring shaped member having at least one opening therein for permitting fluid to flow between segment portions connected thereto.

18. The mounting device according to claim 14, wherein said rigid inner portion comprises at least two at least partially contiguously mounted parts, and said dividing means is inserted between said at least two parts.

19. The mounting device according to claim 14, wherein said rigid inner portion has at least one groove therein for receiving said dividing means, said dividing means being rotatable, during assembly of said rigid inner portion, in said at least one groove in said rigid inner portion.

* * * * *

UNITED STATES PATENT AND TRADEMARK OFFICE
CERTIFICATE OF CORRECTION

PATENT NO. : 4,896,867
DATED : January 30, 1990
INVENTOR(S) : Georg SCHYBOLL, et al.

It is certified that error appears in the above-identified patent and that said Letters Patent is hereby corrected as shown below:

Title page, item [76]:

In the "Inventors" section, insert --Bad-- before "Neuenahr".

Signed and Sealed this

Eighth Day of January, 1991

Attest:

HARRY F. MANBECK, JR.

*Attesting Officer*     *Commissioner of Patents and Trademarks*